United States Patent
Ciulla et al.

(10) Patent No.: US 9,103,372 B2
(45) Date of Patent: Aug. 11, 2015

(54) HUB-BEARING ASSEMBLY FOR ROTATABLY MOUNTING A TILLING DISC

(71) Applicant: Aktiebolaget SKF, Göteborg (SE)

(72) Inventors: Luca Ciulla, Turin (IT); Carlo Maldera, Giaveno (IT); Yannick Sellier, Forges-les-Bains (FR); Hans-Joachim vom Stein, Odenthal (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/950,633

(22) Filed: Jul. 25, 2013

(65) Prior Publication Data

US 2014/0029885 A1  Jan. 30, 2014

(30) Foreign Application Priority Data

Jul. 25, 2012  (IT) .............................. TO2012A0651

(51) Int. Cl.
*F16C 27/06* (2006.01)
*A01B 71/04* (2006.01)

(52) U.S. Cl.
CPC ............... *F16C 27/066* (2013.01); *A01B 71/04* (2013.01); *F16C 2310/00* (2013.01)

(58) Field of Classification Search
CPC ....... A01B 71/04; F16C 19/08; F16C 19/181; F16C 19/183; F16C 27/06; F16C 27/066; F16C 2310/00

USPC .................. 384/460, 490, 535, 536, 581, 582
See application file for complete search history.

(56) References Cited

U.S. PATENT DOCUMENTS

| | | | | |
|---|---|---|---|---|
| 2,670,242 A * | 2/1954 | Beckman | ....................... | 384/536 |
| 2,771,326 A * | 11/1956 | Smith et al. | ................... | 384/460 |
| 2,783,103 A * | 2/1957 | Hamilton | ....................... | 384/460 |
| 5,868,503 A * | 2/1999 | Bade | ............................. | 384/536 |
| 5,975,764 A * | 11/1999 | Okada et al. | ................... | 384/476 |
| 2004/0170350 A1* | 9/2004 | McCallum et al. | ........... | 384/536 |
| 2004/0228557 A1 | 11/2004 | Ruckle et al. | | |
| 2010/0135784 A1* | 6/2010 | Brewster et al. | .............. | 384/535 |

FOREIGN PATENT DOCUMENTS

| | | |
|---|---|---|
| DE | 3304397 A1 | 8/1984 |
| DE | 4237190 C1 | 1/1994 |
| DE | 20012666 U1 | 12/2000 |
| EP | 0825429 A2 | 2/1998 |
| EP | 0840024 A1 | 5/1998 |
| WO | 0219791 A1 | 3/2002 |

* cited by examiner

*Primary Examiner* — James Pilkington
(74) *Attorney, Agent, or Firm* — Bryan Peckjian; SKF USA Inc. Patent Dept.

(57) ABSTRACT

A hub-bearing assembly is disclosed, wherein the hub-bearing assembly is used for rotatably mounting a tilling disc about an axis of rotation is disclosed. The hub-bearing assembly comprises an annular hub comprising an axially extending tubular portion defining a cylindrical housing and an outer flange for mounting a disc, a bearing unit mounted in the housing, and an elastic damping body arranged in the housing and radially interposed between the hub and an outer ring of the bearing unit.

11 Claims, 2 Drawing Sheets

US 9,103,372 B2

HUB-BEARING ASSEMBLY FOR ROTATABLY MOUNTING A TILLING DISC

CROSS-REFERENCE TO RELATED APPLICATION

This application is a United States Non-Provisional Utility Patent Application claiming the benefit of Italian Patent Application Number TO2012A000651 filed on 25 Jul. 2012, which is incorporated herein in its entirety.

TECHNICAL FIELD

The present invention relates to a hub-bearing assembly for a tilling disc.

BACKGROUND ART

As is well known, tilling discs are usually mounted rotatably on respective spindles projecting from the frame of a plough or other agricultural machine.

WO 2002/019791 A discloses a hub-bearing assembly for rotatably mounting a tilling disc about an axis of rotation. The assembly comprises an annular hub having an axially extended tubular portion defining a generally cylindrical housing and a radially outer flange for fixing to a disc. In the housing is mounted a bearing unit comprising an outer ring, one or two inner rings and a dual set of rolling elements interposed between the outer and inner rings. In other solutions, the outer ring of the bearing is integrated into the flanged hub, forming therewith a single piece.

During use, impacts suffered by the disc against stones and similar damage the raceways of the bearing and shorten its working life.

It is therefore an object of the invention to create a hub-bearing assembly for a tilling disc capable of remedying the above-mentioned disadvantage.

DISCLOSURE OF INVENTION

It is therefore an object of the invention to create a hub-bearing assembly for a tilling disc capable of remedying the above-mentioned disadvantage.

This and other objects and advantages, which will be better understood hereafter, are achieved according to an aspect of the invention by a hub-bearing assembly for rotatably mounting a tilling disc about an axis of rotation, the hub-bearing assembly comprising:
  an annular hub including:
    an axially extending tubular portion defining a generally cylindrical housing, and
    a radially outer flange for mounting a disc;
  a bearing unit mounted within the housing and comprising an outer ring, a pair of inner rings and a dual set of rolling elements, interposed between the outer ring and the inner rings; and
  an elastic damping body arranged in the housing and radially interposed between the hub and the outer ring of the bearing unit.

Other advantageous features are defined in the dependent claims.

Briefly, the hub-bearing assembly comprises an elastic damping body radially interposed between the hub and the outer ring of the bearing unit. The elastic damping body absorbs part of the dynamic stresses coming from impacts of the disc against stones. These stresses, no longer being fully transferred to the bearing and its rolling elements, do not noticeably damage the raceways. According to some preferred embodiments, the relative movements between the bearing unit and the housing formed from the hub for the bearing are limited due to the forced mounting of the elastic body between the bearing and the hub and owing to particular shapes taken by the outer surface of the outer bearing ring and by the housing of the hub in which the bearing unit is accommodated by means of the interposition of the elastic damping body.

BRIEF DESCRIPTION OF DRAWINGS

A description will now be given of a few preferred, but not limiting, embodiments of the invention. Reference is made to the attached drawings, in which.

DETAILED DESCRIPTION

Figure 2:
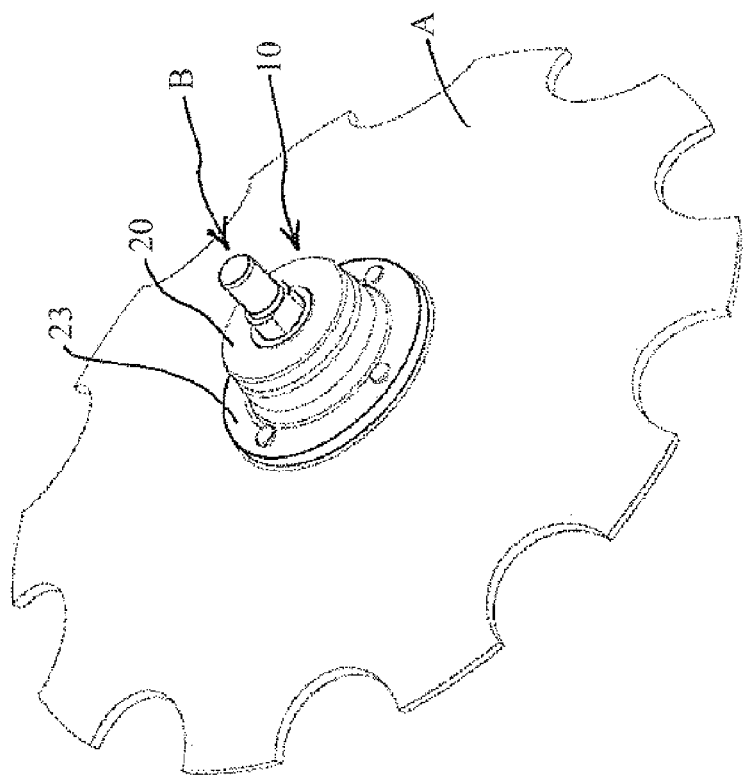
FIG. 2 is a perspective view of the disc with the hub-bearing assembly and spindle of FIG. 1.
Figure 1:
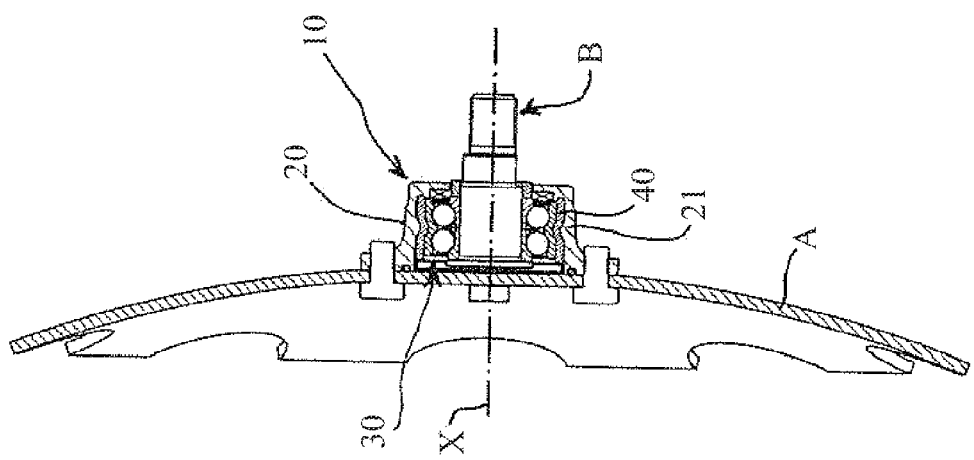
FIG. 1 is a view in axial section of a tilling disc mounted rotatably about a spindle by means of a hub-bearing assembly according to an embodiment of the invention.

Making reference now to the drawings, a hub-bearing assembly according to an embodiment of the invention, indicated in its entirety 10, serves for mounting a disc A in freely rotatable manner about an axis of rotation x defined by a spindle B projecting in cantilever from a machine or an agricultural implement (not illustrated), such as for example a plough, a harrow or similar. The characteristics of the disc A, which may be of any known type, for example a disc for ploughing or a disc for sowing (suitable for opening furrows in a previously ploughed terrain), are not significant for the purposes of understanding the present invention and will therefore not be described here in detail.

The assembly 10 comprises a hub 20, a bearing unit 30 housed in the hub 20 and an elastic damping body 40 interposed between the hub and the bearing unit.

The hub 20, of overall annular form, has an axially extended principal tubular portion 21, which defines within itself a generally cylindrical housing 22 for the bearing unit 30. The housing 22 is delimited radially by a substantially cylindrical inner wall 22a, described below. Throughout the present description and in the claims, the terms and expressions indicating positions and orientations such as "radial" and "axial" are to be taken to refer to the central axis of rotation x of the bearing unit 30.

From a first axial end of the tubular portion 21 of the hub there extends a radially outer flange 23 having a plurality of axial bores 24 for mounting the disc A. From a second axial end of the tubular portion 21 there extends a radially inner flange 25 which axially delimits the housing 22 on the side further from the disc.

Figure 3:
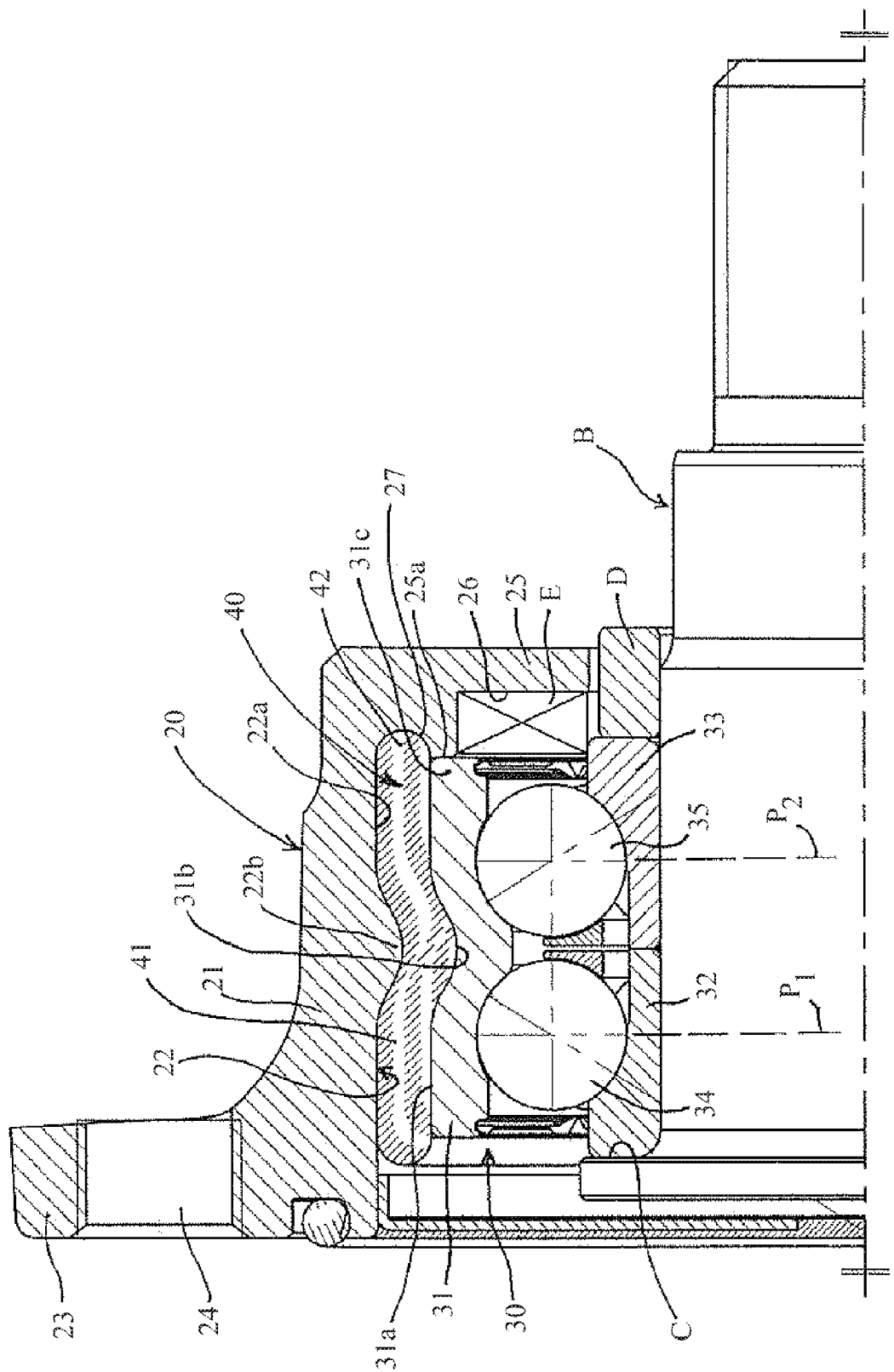
FIG. 3 is an enlarged view, in partial axial section, of the hub-bearing assembly and spindle of FIG. 1.

The bearing unit 30 is a bearing unit of the so-called first generation, i.e. without radially projecting flanges. The bearing unit 30 comprises a rotatable outer ring 31, a pair of inner rings 32, 33 mounted side by side on the spindle B and a dual set of rolling elements 34, 35, in this example balls, interposed between the outer ring 31 and the inner rings 34, 35. The rotatable outer ring 31 has a substantially cylindrical radially outer wall 31a, more fully described below. Referring to FIG. 3, the first axial end of the outer ring 31 is the end closest to the disc 10, and, the second axial end of the outer ring 31 is the end furthest from the disc 10.

The inner rings 32, 33 are axially locked in position against a shoulder C on the spindle by means of a spacer D forcefully fitted onto the spindle, which is preloaded through a ring-nut (not illustrated) according to a per se known arrangement. Preferably, inner ring 32 extends axially outwardly past the first axial end of the outer ring.

The inner flange 25 extends radially towards the spindle, and provides a radial surface 25a for abutting a radial surface 31c of the outer ring 31 of the bearing. In the embodiment illustrated, the flange 25 further forms an annular recess 26, facing towards the bearing, suitable for accommodating a sealing device schematically indicated E, designed to slide against the spacer D or against another element integral with the spindle B in order to hermetically seal the housing 22 of the bearing towards the outside. The annular recess 26 of the inner flange 25 may extend over the entire radial side of the sealing device.

The elastic damping body 40 allows the disc A to elastically absorb the impacts which it receives during use, and to limit damage, undesired movements and the appearance of play which the bearing unit may undergo as a result of impacts transmitted by the disc.

The elastic damping body 40 is comprised of a tubular sleeve of elastomeric material, radially interposed between the substantially cylindrical wall 22a of the housing 22 and the radially outer surface 31a of the outer ring 31 of the bearing.

In a preferred embodiment, the elastic body 40 is fabricated at a preliminary stage, for example by extrusion or hot forming, and is then forcibly introduced (cold pressed) into a cylindrical gap located between the surfaces 22a and 31a, after the bearing unit has been introduced into the housing 22.

The elastic body 40 has a tubular wall 41 having a radial thickness which, in the undeformed condition, i.e. before the introduction of the body 40 between the walls 22a and 31a, is preferably greater than a dimension or radial distance which separates the surface 31a from the wall 22a. Due to this arrangement, the elastic body 40 remains elastically compressed in radial directions between the housing 22 of the hub and the outer bearing ring 31.

According to an alternative embodiment, the elastic body 40 is fabricated by injecting elastomeric material in the fluid state into the cylindrical gap located between the surfaces 22a and 31a, after the bearing unit has been introduced into the housing 22.

In the illustrated embodiment, the elastic body 40 has an axial length greater than the axial length of the outer ring 31 of the bearing, so as to ensure an elastic damping effect on the bearing unit for stresses transmitted thereto by the hub according to any direction or angle. Preferably, the elastic body 40 extends axially outwardly past the first and second axial ends of the outer ring.

To allow a uniform elastic response, the radial thickness of the tubular wall 41 is preferably constant. In order to guarantee correct positioning of the elastic body 40, an annular groove 27 is formed in the housing 22. The annular groove 27 extends into the inner flange 25 at the axial end of the wall 22a located, in use, further from the disc A. The annular groove 27 steadily accommodates an edge 42 of the elastic body 40. One axial end of the elastic damping body 40 may be free of abutment.

Preferably, the wall 22a is not perfectly cylindrical but has a protrusion projecting in a radially inner direction, in this example a protrusion 22b in the form of an annular ridge, suitable for favoring a steady axial positioning of the elastic body 40 with respect to the housing 22 and the hub 20. In this example, the protrusion 22b is shaped as an annular ridge which extends circumferentially around the substantially cylindrical inner wall 22a. In the particular embodiment illustrated, also the radially outer surface 31a of the outer ring 31 is not perfectly cylindrical but provides a radial recess 31b preferably in the form of an annular channel or groove extending circumferentially, with the object of favoring a stable relative axial positioning of the elastic body 40 with respect to the bearing unit. In order to maintain a uniform level of compression in the body 40, it is preferable that the radial protrusion 22b and the radial recess 31b should be aligned in a same radial plane, so as to maintain a constant radial distance between the facing surfaces 22a and 31a. Advantageously, the protrusion 22b is located in an axially intermediate position between two radial planes P1, P2 in which lie the two sets of rolling elements 34, 35.

In a preferred embodiment, the annular groove 31b is formed in a particularly convenient manner if the outer ring 31 is fabricated starting from steel tube cut and subjected to cold rolling so as to form the annular groove 31b. The specific form illustrated of the annular groove 31b is not to be considered limiting, since grooves of different profile, for example of square profile, can also be effective for axially locking the outer ring 31. The material of the damping body 40, being elastically deformable, makes it possible to adapt the shape of the body 40 to that of the annular groove 31b.

In a preferred embodiment, the elastic damping body 40 is axially retained between the hub and the outer ring of the bearing simply as a result of the elastic compression to which the body 40 is subjected, without necessitating further retaining means, such as for example the application of adhesive. The elastic damping body 40 is held even more stably as a result of the protrusion 22b, which generates a further radial compression stress, favoring the axial retention of the elastic body 40.

It is to be understood that the invention is not limited to the embodiments here described and illustrated, which are to be considered examples of the assembly; it will be clear to experts in the field that various changes may be made to the functions and configuration of the elements described in the exemplary embodiment, without departing from the scope of the invention as defined in the attached claims and their equivalents.

What is claimed is:

1. A hub-bearing assembly for rotatably mounting a tilling disc about an axis of rotation, the hub-bearing assembly comprising:
    an annular hub including:
        an axially extending tubular portion defining a generally cylindrical housing, and
        a radially outer flange for mounting a disc;
    a bearing unit mounted within the housing and comprising an outer ring, a pair of inner rings and a dual set of rolling elements, interposed between the outer ring and the inner rings; and
    an elastic damping body arranged in the housing and radially interposed between the hub and the outer ring of the bearing unit, wherein the elastic damping body extends axially outwardly past a first axial end and a second axial end of the outer ring, wherein one axial end of the elastic damping body is free of abutment,
    the housing is delimited radially by a substantially cylindrical inner wall, and wherein the outer ring provides a radially outer surface,
    the elastic damping body further comprising a tubular sleeve of elastomeric material, radially interposed between the substantially cylindrical wall of the housing and the radially outer surface of the outer ring, the elastic damping body is provided with a tubular wall having a radial thickness which, in an undeformed condition, is greater than a radial distance separating the radially outer surface of the outer ring from the substantially cylindrical wall of the housing, whereby the elastic damping body is radially compressed between the housing and the outer ring, wherein the radially outer flange extends from a first axial end of the tubular portion of the hub;

a radially inner flange extends from a second axial end of the tubular portion; and an annular groove formed in the housing, wherein the annular groove extends into the radially inner flange and receives an edge of the elastic damping body, wherein the radially inner flange extends over a radial side of a sealing device.

2. A hub-bearing assembly according to claim 1, wherein the tubular wall has a substantially constant radial thickness.

3. A hub-bearing assembly according to claim 1, wherein one of the inner rings extends axially outwardly past the first axial end of the outer ring.

4. A hub-bearing assembly for rotatably mounting a tilling disc about an axis of rotation, the hub-bearing assembly comprising:

an annular hub including:
   an axially extending tubular portion defining a generally cylindrical housing, and
   a radially outer flange for mounting a disc;

a bearing unit mounted within the housing and comprising an outer ring, a pair of inner rings and a dual set of rolling elements, interposed between the outer ring and the inner rings; and an elastic damping body arranged in the housing and radially interposed between the hub and the outer ring of the bearing unit, wherein the housing is delimited radially by a substantially cylindrical inner wall, and wherein the outer ring provides a radially outer surface, the elastic damping body comprising a tubular sleeve of elastomeric material radially interposed between the substantially cylindrical wall of the housing and the radially outer surface of the outer ring, the elastic damping body is provided with a tubular wall having a radial thickness which, in an undeformed condition, is greater than a radial distance separating the radially outer surface of the outer ring from the substantially cylindrical wall of the housing, whereby the elastic damping body is radially compressed between the housing and the outer ring, and wherein the radially outer flange extends from a first axial end of the tubular portion of the hub, a radially inner flange extends from a second axial end of the tubular portion, and an annular groove formed in the housing, wherein the annular groove extends into the radially inner flange and receives an edge of the elastic damping body.

5. A hub-bearing assembly according to claim 4, wherein the tubular wall has a substantially constant radial thickness.

6. A hub-bearing assembly according to claim 4, wherein an axial length of the elastic damping body is greater than an axial length of the outer ring.

7. A hub-bearing assembly according to claim 4, the substantially cylindrical inner wall further comprising a protrusion projecting in a radially inner direction.

8. A hub-bearing assembly according to claim 7, wherein the protrusion is in a shape of an annular ridge which extends circumferentially around the substantially cylindrical inner wall.

9. A hub-bearing assembly according to claim 7, wherein the protrusion is located at an axially intermediate position between two radial planes, and wherein each of the two radial plane is defined by a respective set of the two sets of rolling elements.

10. A hub-bearing assembly according to claim 7, the radially outer surface of the outer ring further comprising at least one radial recess extending in a radially inner direction.

11. A hub-bearing assembly according to claim 10, wherein the radial recess is shaped as one of an annular channel or groove, and wherein the radial recess extends circumferentially around the radially outer surface of the outer ring.

* * * * *